(No Model.)

N. KINSLEY & A. HEUSSER.
SNAP HOOK.

No. 359,929. Patented Mar. 22, 1887.

Witnesses
H. S. Rohrer
Wm. J. Gannet

Inventor:
Nathaniel Kinsley
and, Albert Heusser.
By his Attorney
J. E. Duffy

UNITED STATES PATENT OFFICE.

NATHANIEL KINSLEY AND ALBERT HEUSSER, OF TAYLOR, NEVADA.

SNAP-HOOK.

SPECIFICATION forming part of Letters Patent No. 359,929, dated March 22, 1887.

Application filed September 18, 1886. Serial No. 213,875. (No model.)

*To all whom it may concern:*

Be it known that we, NATHANIEL KINSLEY and ALBERT HEUSSER, of Taylor, in the county of White Pine and State of Nevada, have invented certain new and useful Improvements in Spring-Snaps; and we do hereby declare that the following is a full, clear, and exact description of the invention, which will enable others skilled in the art to which it appertains to make and use the same, reference being had to the accompanying drawings, and to the letters of reference marked thereon, which form part of this specification.

Our invention relates to snap-hooks, and has for its object to provide a device of this class which will be simple in construction, cheap and durable in use, and of such construction whereby it may be readily unfastened while under strain.

With these objects in view, our invention consists in certain details of construction, arrangement, and combination of parts, which will be more fully described hereinafter, and the specific points of novelty in which will be designated in the appended claim.

Figure 1:
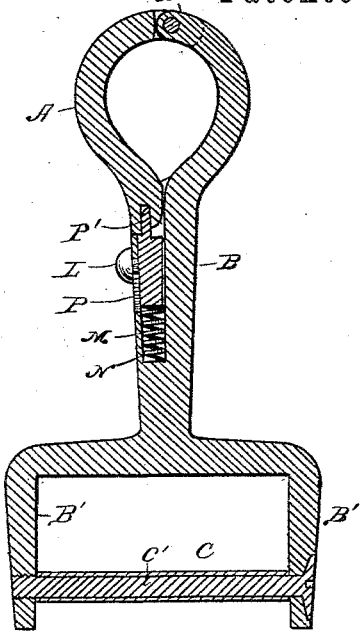
Figure 2:
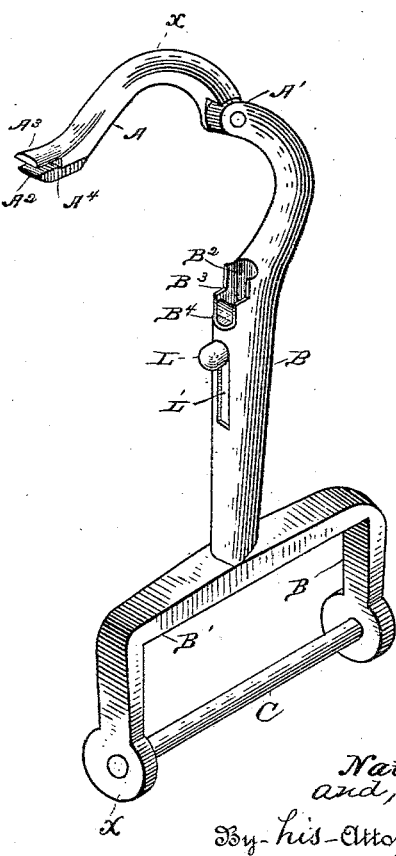

In the drawings connected with this application, Figure 1 is a longitudinal section of the snap-hook through $x\ x$ in Fig. 1, having the hook closed. Fig. 2 is a perspective view of the same, but with the hook opened.

Referring to the drawings by letter, A is the hook, pivoted at A′ to the extremity of the stem B, which is curved somewhat at its end to form a circle continuous with the hook. The opposite end of said stem B is formed with the bifurcations B′, between which is secured the attaching cross-pin consisting of the screw C′, passing through the cylindrical shield C. It will be observed that the indentation or notch A″ of the hook A, and the pin P in engagement therewith, being in line between the pivot A′ of the hook and the cross-pin C, the strain given to the hook by any link attached thereto is at or near said pivotal point, and there is hence no resultant force tending to swing the hook A away from its securing-pin P. In this way the first feature of our invention is accomplished.

The pin P, we prefer to make cylindrical, easily movable in the hole N in the stem B, and pressed into contact with the hook A by means of the spiral spring M. A button, L, projecting laterally from said pin through the slot L′, enables the pin to be depressed, and thereby disengaged from the notch A″ in the hook. The outer extremity of the pin P, being formed into the flat tongue P′, adapted to enter the notch A″ of the hook, and the edges of said tongue and of the lip A″″ being suitably chamfered, as shown, the contact of said chamfered edges when the hook A is pressed home represses the pin P, so that the former can reach its seat B″, and said pin can enter the notch A″.

To form a tight, smooth joint at the point of the hook's engagement with the stem, we form the projecting lip A‴ at the end of the hook A, which lip, being fitted to lie in the seat B″″ of the stem, makes a smooth continuous surface from the stem B into the hook A.

Having thus fully described our invention, what we claim, and desire to secure by Letters Patent of the United States, is—

In a snap-hook, the combination, with the stem B, having the hole N, provided with the slot L′, of the pin P, mounted in said hole and formed with the tongue P′, the button L, projecting from said pin through said slot, the spring M, for outwardly pressing said pin, and the hook A, pivoted at A′ to the stem and formed with the lips A‴ A″″ and notch A″, for engagement with said tongue P′, the outer portion of said hole N in the stem B being formed with the seat B″″ for receiving said lip A‴ and making a smooth point, as described.

In testimony that we claim the foregoing as our own we affix our signatures in presence of two witnesses.

NATHANIEL KINSLEY.
ALBERT HEUSSER.

Witnesses:
FRANK H. BACKES,
MICHAEL COHEN.